United States Patent [19]
Burton

[11] 3,840,086
[45] Oct. 8, 1974

[54] AUTOMATIC CARTRIDGE TAPE STEERING SYSTEM FOR MACHINES

[76] Inventor: John P. Burton, 100 Colonial, Douglaston, N.Y. 11731

[22] Filed: Feb. 5, 1973

[21] Appl. No.: 329,809

[52] U.S. Cl................ 180/79.1, 46/244 D, 318/568
[51] Int. Cl............................................. B62d 5/04
[58] Field of Search.................. 180/79.1; 46/244 D; 318/568

[56] References Cited
UNITED STATES PATENTS

| | | | |
|---|---|---|---|
| 1,966,145 | 7/1934 | Spots | 46/244 D |
| 2,751,030 | 6/1956 | Null | 180/79.1 |
| 3,061,035 | 10/1962 | King | 180/79.1 |
| 3,472,333 | 10/1969 | Loewenstern | 180/79.1 X |
| 3,582,956 | 6/1971 | Huston | 318/568 X |
| 3,650,097 | 3/1972 | Nokes | 180/79.1 X |

Primary Examiner—David Schonberg
Assistant Examiner—John A. Pekar

[57] ABSTRACT

An automatic steering system for machines, such as, lawn mowers, snow blowers, and the like, which automatically steers the machine by control signals recorded on a cartridge tape. The control signals are converted by electrical circuits to mechanical movement of the steering wheels of the machine by an electromechanical steering mechanism coupled thereto. The machine automatically follows a predetermined path controlled by the signals recorded on the cartridge tape, and when its operation is complete, a control signal automatically terminates the machine's operation.

8 Claims, 9 Drawing Figures

AUTOMATIC CARTRIDGE TAPE STEERING SYSTEM FOR MACHINES

The present invention relates to steering mechanisms for machines, and in particular to an automatic, electromechanical, cartridge tape steering system for a power lawn mower.

Conventional power machines utilized to carry out selected manual tasks, such as lawn mowing, and snow removal, must be steered by an operator either walking behind, or riding on, the machine itself. Since all of the work is done by the machine, and the human operator is required only to steer the machine in the proper direction, a significant amount of human time is expended in carrying out the steering function of the machine.

Accordingly, the present invention provides an automatic steering system for machines, such as, for example, lawn mowers, snow blowers and the like, which steers the machine by a pre-programmed cartridge tape coupled to an automatic, electromechanical steering mechanism coupled to the wheels of the device. The tape cartridge contains directions for steering the machine, which are converted by control circuits to mechanical movement of the steering wheels of the machine in predetermined, timed sequences. The machine automatically follows a predetermined path controlled by the signals on the cartridge tape, and when finished, automatically terminates its operation.

It is, therefore, an object of the present invention to provide an automatic steering mechanism for machines which obviates the need for a human operator to steer the device.

It is also an object of the present invention to provide an automatic steering mechanism for machines which is simple in design, easy to manufacture, and efficient and reliable in operation.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention disclosed.

In the drawings, wherein similar reference numerals denote similar elements throughout the several views.

Figure 1:
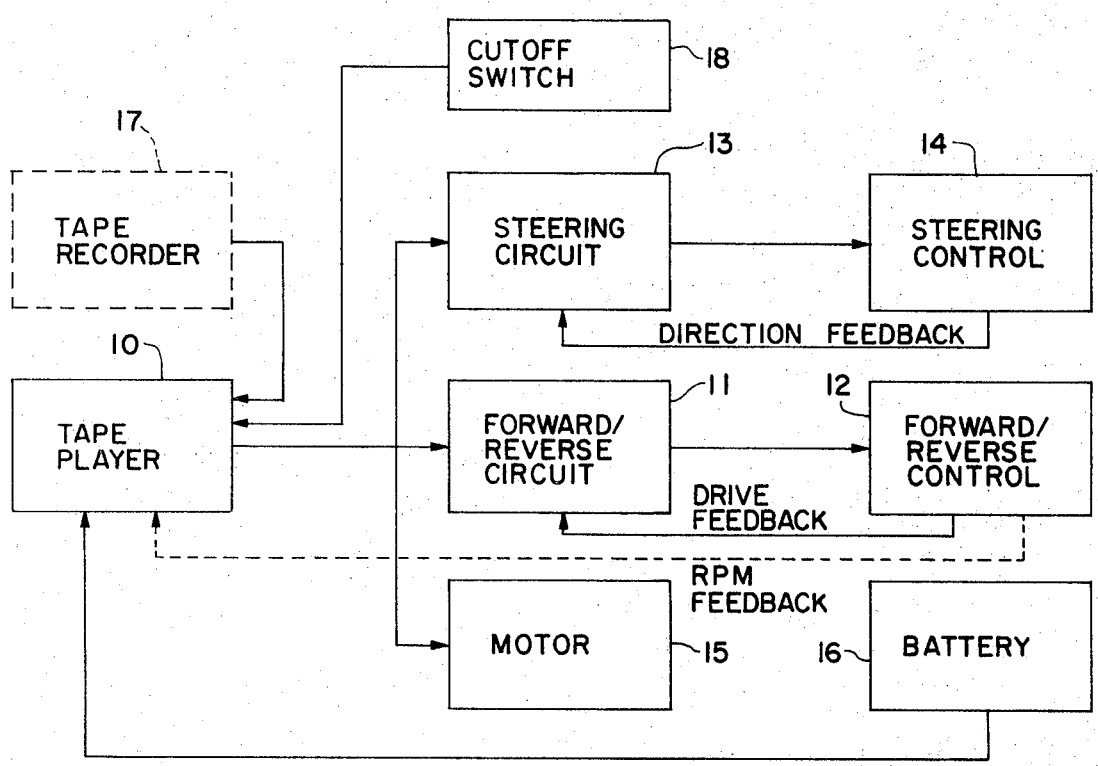
FIG. 1 is a block diagram illustrating in schematic form an automatic electromechanical steering system for machines constructed in accordance with the present invention.
Figure 2:
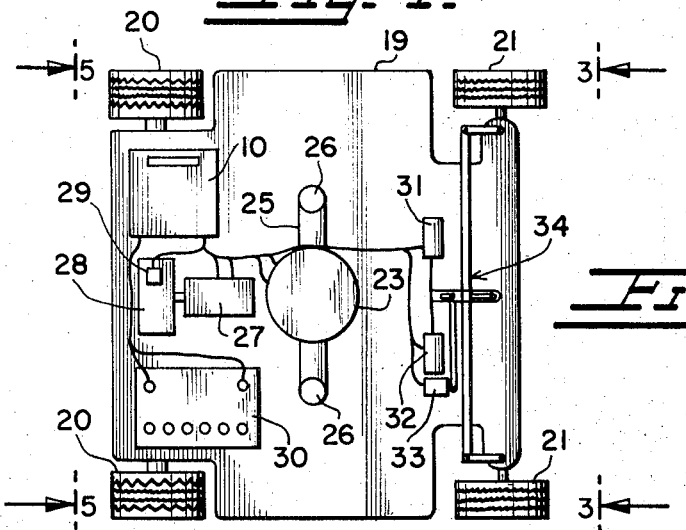
FIG. 2 is a top plan view of a lawn mower equipped with an automatic steering system constructed in accordance with the present invention.
Figure 3:
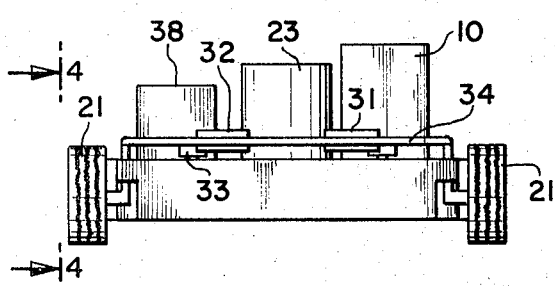
FIG. 3 is an end view of the lawn mower, taken along section 3—3 of FIG. 2.
Figure 4:
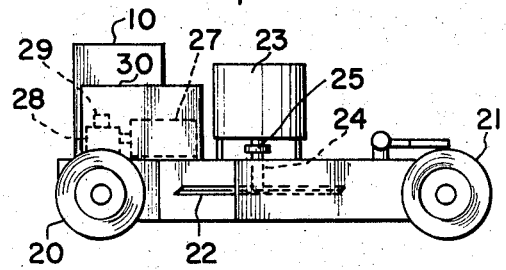
FIG. 4 is a side view of the lawn mower, taken along section 4—4 of FIG. 3.

Referring now to the drawings, specifically FIG. 1, there is shown a schematic block diagram illustrating the steering system of the present invention. The automatic steering control system comprises a tape player 10 which is coupled to a forward reverse drive circuit 11, which activates a forward/reverse drive control 12. Circuit 11, and control 12 comprise the electrical and mechanical portions, respectively, of the drive control mechanism of the steering system of the present invention. Control 12 is coupled by a feedback loop to forward/reverse drive circuit 11 for feeding back information indicating the direction of movement of the machine. Tape player 10 is also coupled to a steering circuit 13 and a steering control 14 which comprise the electrical and mechanical portions, respectively, of the steering control mechanism of the steering system. Steering control 14 is coupled by a feedback loop to circuit 13 for feeding back information regarding the direction of movement of the steering mechanism to the steering circuit. Tape player 10 is also coupled to, and controls, machine motor 15. Battery 16 is also coupled to tape player 10 and supplies electrical power to the electrical and electromechanical components comprising the automatic steering mechanism. Forward/reverse control 12 is coupled by a feedback loop to tape player 10 to feed back RPM information to the tape player for synchronizing the tape player motor with the drive wheels of the machine. Tape recorder 17 comprises an additional, but optional, portion of the steering system. Cut-off switch 18 is coupled to tape player 10 and overrides the entire control mechanism of the machine when activated, shutting the machine down, for preventing any damage to the machine or to objects engaged by the machine.

FIGS. 2–6 illustrate a power lawn mower including the automatic steering mechanism of the present invention. Lawn mower 19 is a rotary type, and includes rear drive wheels 20 and front steering wheels 21 pivotably mounted on mower 19. Mower 19 includes a pair of rotary blades 22 rotatably mounted adjacent each other on mower 19 on shafts 24. Motor 23 mounted on mower 19 is coupled to shafts 24 by belt 25 and pulleys 26. Drive wheels 20 are driven by a separate motor 27 coupled to the wheels by drive transmission 28 which is controlled by a transmission solenoid 29. Tape player 10 is mounted on mower 19 and electrically couples battery 30 to motors 27 and 23, and solenoid 29. Steering solenoids 31, 32 and 33 are mounted at the front end of lawn mower 19, are mechanically coupled by linkage 34 to steering wheels 21. The solenoids are electrically coupled to battery 30 by tape player 10.

Figure 6:
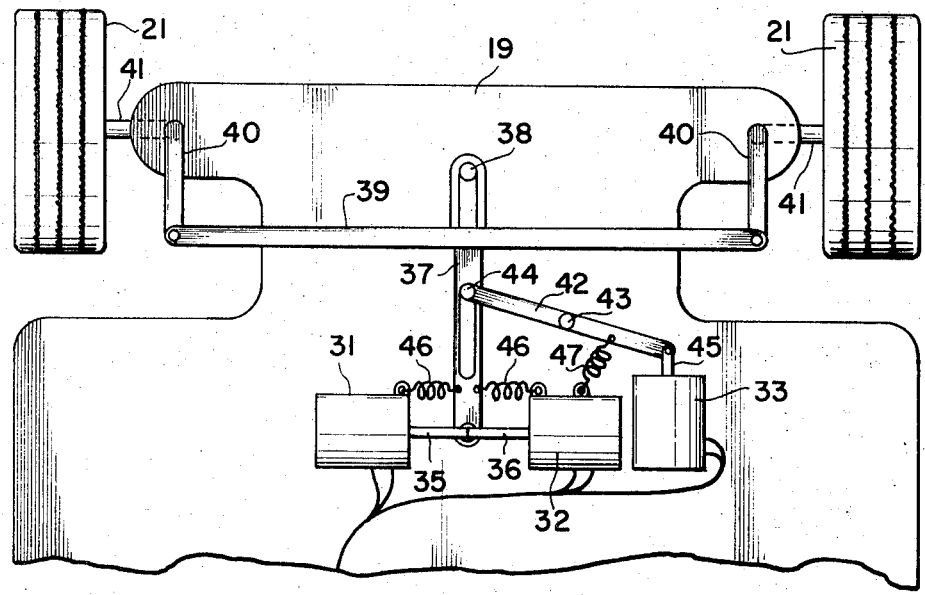
FIG. 6 is a partial, top plan view of the mechanical linkage of the steering system constructed in accordance with the present invention.
Figure 5:
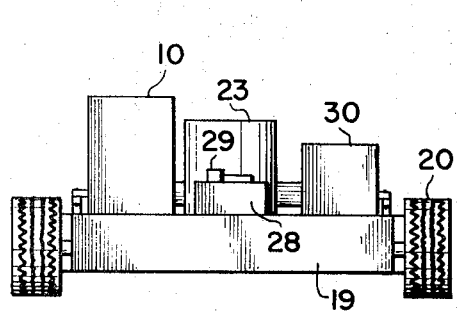
FIG. 5 is another end view of the lawn mower, taken along section 5—5 of FIG. 2.

FIG. 6 illustrates steering linkage 34 in detail. Solenoids 31 and 32 have the shafts 35 and 36 thereof, respectively, pivotably coupled to a steering rod 37 which is coupled to rod linkage 39 and pivotably mounted on mower 19 by a cylindrical pin 38. Transverse steering linkage rod 39 is coupled to steering rod 37 and a pair of L-shaped steering arms 40 which are pivotably mounted on mower 19 and support steering wheel shafts 41 thereon. Solenoid 33 is coupled to rod 37 by a linkage arm 42, which is pivotably mounted at axis 43 on lawn mower 19 and pivotably coupled to rod 37 at axis 44. Solenoid shaft 45 is pivotably coupled to the free end of rod 42. Bias springs 46 and 47 are coupled to solenoids 31 and 32, and 33, respectively, at one end, and rods 37 and 42, respectively, at the other ends thereof. Springs 46 return rod 37 to a position equidistant between solenoids 31 and 32, and spring 47 returns rod 42 to an inwardly withdrawn position adjacent solenoid 33 at one end.

Figure 7:
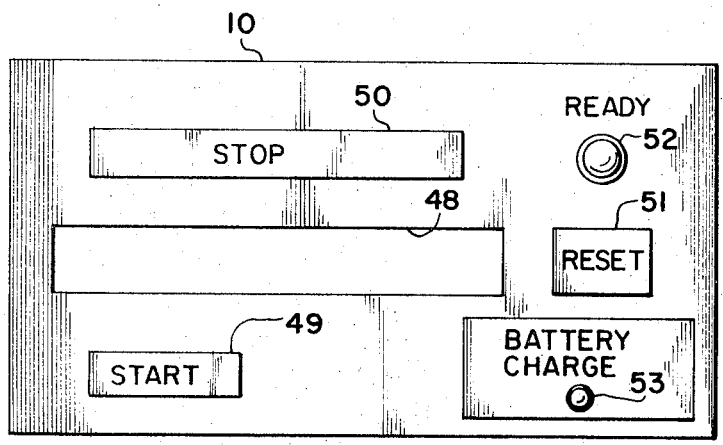
FIG. 7 is a plan view of the control panel of the tape player of the steering system of the present invention.

FIG. 7 illustrates the control panel of tape player 10 in detail. Slot 48 receives a tape cartridge for controlling the steering system, and control buttons 49, 50 and 51 are provided on the front panel for manually starting, stopping and resetting the tape in the cartridge. Indication lights 52 and 53 are provided for indicating when the tape is ready to be played, and when the battery requires charging, respectively.

Figure 8:
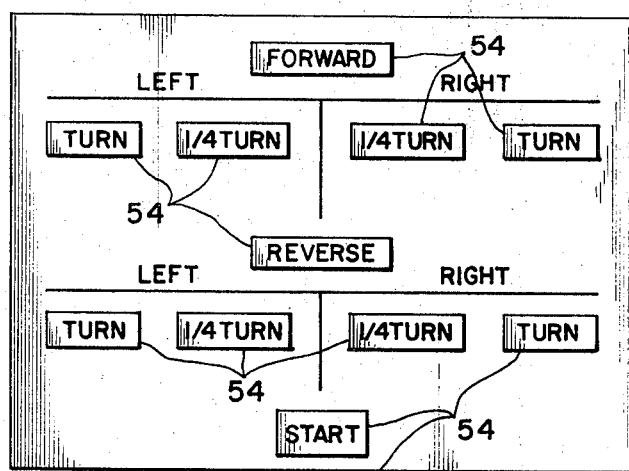
FIG. 8 is a plan view of the control panel for the tape recorder unit of the automatic steering system of the present invention.

FIG. 8 illustrates the control panel for tape recorder 17. A plurality of control buttons 54 are provided in a selected arrangement on the panel for controlling the steering and movement of the lawn mower manually during the recording operation. Control panel 55 is coupled to tape recorder 17, which may be included in the housing of tape player 10, and to the steering and drive circuits of the lawn mower.

Figure 9:
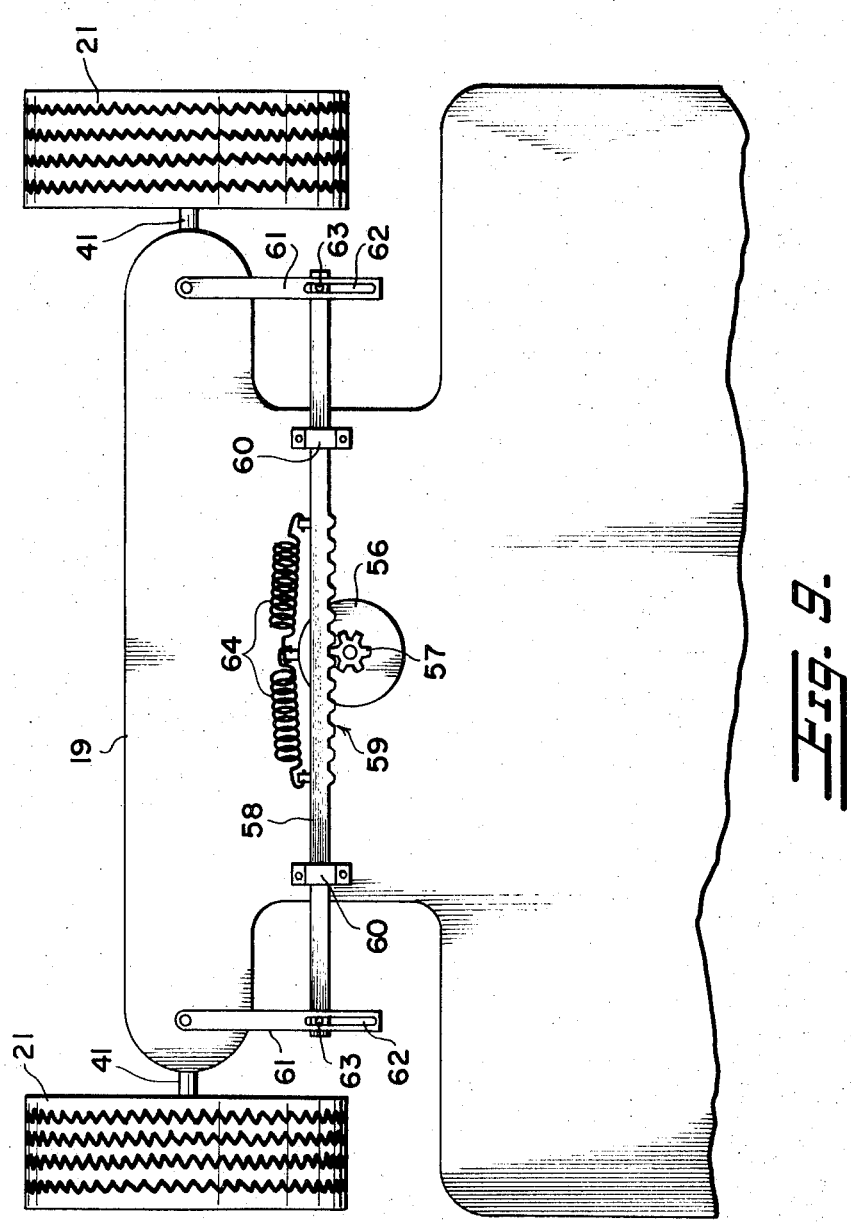
FIG. 9 is a partial top plan view of one end of the lawn mower, showing another embodiment of a mechanical linkage for the steering system of the present invention.

FIG. 9 illustrates another embodiment of a steering linkage for the steering control mechanism of the present invention. This embodiment is particularly useful where large, heavy machines must be steered. The steering system consists of a drive motor 56, mounted on mower 19, which has a drive gear 57 mounted on the output shaft thereof. A transverse steering linkage rod 58 having a rack 59 thereon which engages gear 57 is slidably mounted on mower 19 by shaft mounting brackets 60. Pivotable steering arms 61 are L-shaped and are coupled to steering wheel shafts 41 on which wheels 21 are supported. Arms 61 include elongated slots 62 which receive upwardly extending pins 63 mounted on rod 58 and pivotably couple steering arms 51 to rod 58. Biasing springs 64 are coupled at one end to rod 58 and at the other end to the housing of motor 56 for returning the shaft to a neutral position, after the rod is displaced by motor 56, in which wheels 21 are disposed straight ahead.

The operation of the steering mechanism is as follows:

A blank cartridge recording tape is inserted into slot 48 of tape player 10, and tape recorder 17 is electrically coupled thereto. A temporary tape recording head is coupled to tape player 10 and used in conjunction with tape recorder 17 to record control signals on the cartridge tape. The capstan drive mechanism of tape player 10 is mechanically connected to drive wheel motor 27 by a flexible steel drive shaft so that the tape and the drive wheels of the machine are synchronized. Permanent starting markers are placed on the ground for receiving the wheels of the machine and marking the starting point for the operation to be performed. These markers insure that the operation to be carried out starts at the same point each time, and that the steering wheels of the machine are aligned in the proper position and direction. After the wheels have been placed in the starting markers, the "start" button on control panel 55 is pressed to initiate operation of the machine. The operator of the machine manually supplies the operation control signals for the steering mechanism manually by pressing control buttons 54 on panel 55. As the operator of the machine guides the machine along a predetermined path by means of buttons 54, each of the control signals is recorded by the tape recorder on the cartridge tape. When the machine is to be stopped, the "stop" button on panel 55 is pressed, the operation of the machine is terminated, and a termination signal is recorded indicating the end of the cycle of operation of the machine. After the tape recording operation is completed, the control panel 55, the temporary recording head in tape player 10, and tape recorder 17 are electrically disconnected from the tape player. Reset button 51 on tape player 10 is then pressed, and the cartridge tape is rewound to its starting end to ready the machine for automatic operation.

To automatically operate the machine, the steering wheels thereof are placed in the permanent starting markers, and reset button 51 is pressed to make sure the tape is rewound to its initial starting position. When the tape is at its starting end, ready light 52 lights up, and indicates that the machine is ready for operation. Start button 49 is then pressed by the operator of the machine, to start the cartridge tape, and the machine then begins automatic operation. As stated previously, the capstan drive mechanism for the tape player and the drive wheel motor of the machine are connected by a flexible steel shaft, indicated schematically in FIG. 1 as "RPM feedback" so that the driving wheels and the tape are synchronized and the steering operations recorded on the tape are carried out at the proper locations along the path travelled by the machine.

Each of the signals recorded on the tape cartridge are amplified and transmitted to the steering control circuitry 13 and the drive control circuitry 11. Each of these circuits are of conventional electronic design, and transform an audio frequency control signal to a DC voltage output signal which is applied to steering control 14 and drive control 12 to effect the steering of the machine. Each of the DC voltage signals are applied to solenoid 31, 32 and 33 for steering the machine, and solenoid 29 for controlling the direction of movement thereof. The steering solenoids enable steering wheels 21 to be positioned in five different steering positions. Solenoids 31 and 32 have two positions, extending outwardly from the solenoid and withdrawn therein. Solenoids 31 and 32 are illustrated in FIG. 6 in their neutral position between the outwardly extending and withdrawn positions thereof. In this neutral position, steering wheels 21 are positioned straight ahead. The application of the DC voltage control signals to solenoids 31 and 32 move the steering linkage for the steering wheels in opposite directions for steering the machine to the right or left. The straight ahead position, and the left and right turning positions comprise three of the five positions for the steering mechanism. Solenoid 33 is illustrated in FIG. 6 in its withdrawn position, and upon application of a DC voltage, it moves outwardly to its fully extended position, thereby changing the fulcrum point of the steering linkage. When extended, rod 42 moves inwardly in the slot provided in rod 37, and the number of degrees through which steering wheels 21 are turned by movement of the solenoid push rods 35 and 36 is increased, thereby providing two additional steering positions for the machine for decreasing the turning radius thereof. Springs 46 return the solenoids and steering linkage to the neutral, straight ahead position, while spring 47 returns rod 45 to its fully withdrawn position. Simultaneously, control signals are transmitted to solenoid 29, for controlling the drive wheels of the machine, and thus the direction of movement thereof. Solenoid 29 is preferably spring-biased so that the forward directional transmission is engaged when the spring-loaded solenoid is de-energized, and the reverse position is engaged when the solenoid is energized. The spring of the solenoid preferably returns the transmission lever to the forward position when the solenoid is de-energized.

Electrical power for motors 27 and 23, as well as for the tape player 10 and tape recorder 17, is provided by a 12-volt battery, preferably a heavy-duty lead acid type. Power to the entire machine is cut off by switch 18, which is attached to the machine on one of the lower outside forward edges of the structure thereof. The switch prevents damage to the mower, or a foreign object in the path of the mower, by shutting down the operation thereof when the object is engaged.

In the embodiment of FIG. 9, DC motor 56 is reversible and is controlled by DC voltage signals applied thereto by the steering control circuitry. Each signal turns the drive gear 57, and moves rod 58, in a direction corresponding to the polarity of the signal, and through a predetermined length of rod 58 corresponding to the duration of the signal. Steering wheels 21 are pivoted to corresponding left and right steering positions. Springs 64 return rod 58 to a neutral position in which wheels 21 are straight ahead, when motor 56 is de-energized.

It should be noted that although the invention has been described herein particularly with respect to a power lawn mower, the steering system may be utilized to control any other type of power machine.

While only several embodiments of the present invention have been shown and described, it will be obvious to those persons of ordinary skill in the art that many changes and modifications may be made thereunto without departing from the spirit and scope of the invention.

What is claimed is:

1. An automatic steering system for machines including steering wheels, drive wheels, and at least one drive motor coupled to the drive wheels comprising:

a tape player mounted on the machine and including a prerecorded cartridge tape having control signals recorded thereon for controlling the operation of the machine;

a steering control circuit coupled to said tape player;

a steering control mechanism coupled to said steering control circuit and responsive thereto and to the steering wheels of the machine for controlling movement thereof, said steering control mechanism comprising at least two solenoids electrically coupled to said steering circuit and mechanically coupled to the steering wheels of the machine, for controlling the position of said steering wheels with respect to the machine, said steering control mechanism including a mechanical linkage coupled to said steering wheels and pivotable about a moveable fulcrum, and wherein said steering mechanism further comprises an additional solenoid, mounted on the machine, and coupled to said moveable fulcrum point of said mechanical linkage for moving said fulcrum point about which said linkage pivots so as to increase and decrease the turning radius of the steering wheels of the machine;

a drive control circuit coupled to said tape player; and a drive control mechanism coupled to the drive wheels and drive motor of the machine for controlling the directional movement of the drive wheels of the machine.

2. The steering system as recited in claim 1, further comprising a tape recorder, mounted on the machine and coupled to said tape player, and manual control means coupled to said tape player, for generating control signals and controlling the operation of the machine, said control signals generated by said control means being recorded on said cartridge tape by said tape player in sequence.

3. The steering system as recited in claim 1, wherein said drive control mechanism comprises a forward-reverse transmission, coupled to the drive wheels and said drive motor, and a solenoid, electrically coupled to said drive control circuit and mechanically coupled to said transmission, for controlling the directional movement of the machine.

4. The steering system as recited in claim 3, wherein the drive motor is an electric motor, and wherein said machine further comprises an electrical battery, mounted on the machine and coupled to said tape player, for activating said steering and drive control circuits, said solenoids, said transmission, said drive motor and said tape player.

5. The steering system as recited in claim 1, further comprising a cutoff switch, mounted on the machine at the forward end thereof, and electrically coupled to said tape player, for disconnecting said battery from said tape player when said switch is engaged by an object.

6. The steering system as recited in claim 1, further comprising bias springs, coupled to said mechanical linkage, for returning said steering wheels to a straight-ahead position with respect to the machine when said solenoids are de-energized.

7. The steering system as recited in claim 1, wherein said steering mechanism comprises a reversible DC motor mounted on said machine, and having a drive gear mounted on the output shaft thereof, and a moveable transverse steering rod, coupled to the steering wheels of the machine, and including a rack engaging said drive gear, said motor being coupled to said steering circuit and moving said transverse rod for a predetermined duration in a predetermined direction for controlling the turning movement of said steering wheels.

8. The steering system as recited in claim 7, further comprising bias springs, coupled to said rod at one end thereof, and to the machine, for returning the steering wheels of the machine to a straight-ahead position with respect to the machine when said motor is de-energized.

* * * * *

UNITED STATES PATENT OFFICE
CERTIFICATE OF CORRECTION 3,840,086            Dated October 18, 1974

Inventor(s)    John P. Burton

It is certified that error appears in the above-identified patent and that said Letters Patent are hereby corrected as shown below:

Title page, Item No. 76, delete "Douglaston" and insert -- East Northport --.

Signed and sealed this 14th day of January 1975.

(SEAL)
Attest:

McCOY M. GIBSON JR.
Attesting Officer

C. MARSHALL DANN
Commissioner of Patents